(12) United States Patent
Sun et al.

(10) Patent No.: US 8,055,051 B2
(45) Date of Patent: Nov. 8, 2011

(54) METHOD AND SYSTEM FOR SELECTING THE NUMBER OF GAUSSIAN MODES FOR THE SEGMENTATION OF CARDIAC MAGNETIC RESONANCE (MR) IMAGES

(75) Inventors: Ying Sun, Singapore (SG); Marie-Pierre Jolly, Hillsborough, NJ (US); Jens Gühring, Monmouth Junction, NJ (US)

(73) Assignee: Siemens Aktiengesellschaft, München ( * ) Notice: Subject to any disclaimer, the term of this patent is extended or adjusted under 35 U.S.C. 154(b) by 476 days.

(21) Appl. No.: 12/393,097

(22) Filed: Feb. 26, 2009

(65) Prior Publication Data

US 2009/0290775 A1 Nov. 26, 2009

Related U.S. Application Data

(60) Provisional application No. 61/055,185, filed on May 22, 2008.

(51) Int. Cl.
*G06K 9/00* (2006.01)

(52) U.S. Cl. ........................................................ 382/131

(58) Field of Classification Search .................. 382/130, 382/131
See application file for complete search history.

(56) References Cited

U.S. PATENT DOCUMENTS

| 7,079,674 B2 * | 7/2006 | Paragios et al. ............... 382/128 |
| 2003/0053667 A1 * | 3/2003 | Paragios et al. ............... 382/128 |

* cited by examiner

*Primary Examiner* — Roy M Punnoose
(74) *Attorney, Agent, or Firm* — Donald B. Paschburg; F. Chau & Associates, LLC

(57) ABSTRACT

A method for automatically selecting a number of Gaussian modes for segmentation of a cardiac magnetic resonance (MR) image, including: identifying a left ventricle (LV) in a cardiac MR image slice; quantifying the LV blood pool; obtaining a mask for the LV blood pool; generating a ring mask for a myocardium of the LV from the LV blood pool mask; fitting three Gaussian modes to a histogram of the image slice to obtain a corresponding homogeneity image for the myocardium; computing a quality of fitting (QOF) measure for the three Gaussian modes based on the corresponding homogeneity image; repeating the fitting and computing steps for four and five Gaussian modes; and selecting the homogeneity image of the number of Gaussian modes with the largest QOF measure as the homogeneity image for processing.

15 Claims, 4 Drawing Sheets (a)

(b)

(c)

METHOD AND SYSTEM FOR SELECTING THE NUMBER OF GAUSSIAN MODES FOR THE SEGMENTATION OF CARDIAC MAGNETIC RESONANCE (MR) IMAGES

CROSS-REFERENCE TO RELATED APPLICATION

This application claims the benefit of U.S. Provisional Application No. 61/055,185, filed May 22, 2008, the disclosure of which is incorporated by reference herein in its entirety.

BACKGROUND OF THE INVENTION

1. Technical Field

The present invention relates to segmenting cardiac magnetic resonance (MR) images.

2. Discussion of the Related Art

Cardiovascular disease is the leading cause of death in the United States. Mortality has been declining over the years as lifestyle has changed, but the decline is also due to the development of new technologies to diagnose disease. One of these techniques is magnetic resonance imaging (MRI) which provides time-varying three-dimensional imagery of the heart. To help in the diagnosis of disease, physicians are interested in identifying the heart chambers, the endocardium and epicardium, and measuring the change in ventricular blood volume (ejection refraction) and wall thickening properties over the cardiac cycle. The left ventricle is of particular interest since it pumps oxygenated blood out to distant tissue in the entire body.

Tracking cardiac wall motion in MR images can be used to characterize meaningful functional changes. Different segmentation techniques for extracting the myocardium in cardiac MR images are known. One such technique that has been described previously involves the computation of a so-called "homogeneity image" as one of the processing steps.

A homogeneity image is computed as the response to the second Gaussian mode out of three, four or five Gaussians that are fitted to the intensity histogram of a cardiac MR image. The different modes correspond to different tissue classes such as, lung, myocardium and blood. Sometimes, however, blood is considered as consisting of two Gaussian modes due to its inhomogeneous intensity. In addition, other structures in cardiac MR images may have higher intensity values than blood. Therefore, the right number of Gaussian modes to be fitted to the histogram can be three, four or five, depending on the composition of tissues present in a region of interest in a cardiac MR image.

To obtain an appropriate homogeneity image for the myocardium, it is desirable to select the number of Gaussian modes that results in the best mode separation. Accordingly, there is a need for a criterion that measures how well a homogeneity image serves as one of the input images for segmentation.

SUMMARY OF THE INVENTION

In an exemplary embodiment of the present invention, a method for automatically selecting a number of Gaussian modes for segmentation of a cardiac magnetic resonance (MR) image, comprises: identifying a left ventricle (LV) in a cardiac MR image slice; quantifying the LV blood pool; obtaining a mask for the LV blood pool: generating a ring mask for a myocardium of the LV from the LV blood pool mask; fitting three Gaussian modes to a histogram of the image slice to obtain a corresponding homogeneity image for the myocardium; computing a quality of fitting (QOF) measure for the three Gaussian modes based on the corresponding homogeneity image; repeating the fitting and computing steps for four and five Gaussian modes; and selecting the homogeneity image of the number of Gaussian modes with the largest QOF measure as the homogeneity image for processing.

The method further comprises determining inner and outer contours of the myocardium using the selected homogeneity image.

The QOF measure is computed by the following equation:

$$QOF = \left(\frac{1}{N}\sum_{(i,j)\in S} H_{ij}\right)\log(N),$$

where S is a collection of pixels that meet two constraints: $H_{ij}$ and $R_y$, N is the total number of pixels in S, $H_{ij}$ is a probability of a pixel's inclusion in the LV blood pool and $R_y$ indicates that a pixel was identified as part of the LV blood pool by the ring mask. $H_{ij}>$about 0.25 and $R_y=$about 1.

In an exemplary embodiment of the present invention, a system for automatically selecting a number of Gaussian modes for segmentation of a cardiac MR image, comprises: a memory device for storing a program: and a processor in communication with the memory device, the processor operative with the program to: identify an LV in a cardiac MR image slice; quantify the LV blood pool; obtain a mask for the LV blood pool; generate a ring mask for a myocardium of the LV from the LV blood pool mask; fit three Gaussian modes to a histogram of the image slice to obtain a corresponding homogeneity image for the myocardium; compute a QOF measure for the three Gaussian modes based on the corresponding homogeneity image; repeat the fitting and computing steps for four and five Gaussian modes; and select the homogeneity image of the number of Gaussian modes with the largest QOF measure as the homogeneity image for processing.

The processor is further operative with the program to determine inner and outer contours of the myocardium using the selected homogeneity image.

The QOF measure is computed by the following equation:

$$QOF = \left(\frac{1}{N}\sum_{(i,j)\in S} H_{ij}\right)\log(N),$$

where S is a collection of pixels that meet two constraints: $H_{ij}$ and $R_y$, N is the total number of pixels in S, $H_{ij}$ is a probability of a pixel's inclusion in the LV blood pool and $R_y$ indicates that a pixel was identified as part of the LV blood pool by the ring mask. $H_{ij}>$about 0.25 and $R_y=$about 1.

In an exemplary embodiment of the present invention, a computer readable medium tangibly embodying a program of instructions executable by a processor to perform method steps for automatically selecting a number of Gaussian modes for segmentation of a cardiac MR image is provided, the method steps comprising: identifying an LV in a cardiac MR image slice; quantifying the LV blood pool; obtaining a mask for the LV blood pool; generating a ring mask for a myocardium of the LV from the LV blood pool mask; fitting three Gaussian modes to a histogram of the image slice to obtain a corresponding homogeneity image for the myocardium; computing a QOF measure for the three Gaussian modes based on the corresponding homogeneity image; repeating the fitting and computing steps for four and five Gaussian modes: and selecting the homogeneity image of the number of Gaussian modes with the largest QOF measure as the homogeneity image for processing.

The method steps further comprise determining inner and outer contours of the myocardium using the selected homogeneity image.

The QOF measure is computed by the following equation:

$$QOF = \left(\frac{1}{N} \sum_{(i,j) \in S} H_{ij}\right) \log(N),$$

where S is a collection of pixels that meet two constraints: H and $R_y$, N is the total number of pixels in S, $H_{ij}$ is a probability of a pixel's inclusion in the LV blood pool and $R_y$ indicates that a pixel was identified as part of the LV blood pool by the ring mask. $H_{ij}$>about 0.25 and $R_y$=about 1.

In an exemplary embodiment of the present invention, a method for automatically selecting a number of Gaussian modes for image segmentation, comprises: coarsely identifying a region of interest in an image based on its intensity; and optimizing the region of interest by: fitting a first number of Gaussian modes to a histogram of the image to obtain a corresponding homogeneity image for the region of interest; computing a QOF measure for the first number of Gaussian modes based on the corresponding homogeneity image; and repeating the fitting and computing steps for at least one other number of Gaussian modes; selecting the homogeneity image of the number of Gaussian modes with the largest QOF measure as the homogeneity image for processing.

The image comprises an anatomical part.

The image comprises a CT or MR image.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

The present invention presents a method to automatically select the optimal number of Gaussian modes according to a robust quality of fitting measure. It enhances the segmentation method described in U.S. Pat. No. 6,961.454, the disclosure of which is incorporated by reference herein in its entirety, by increasing its robustness and accuracy. The method of the present invention does not require user interaction, and therefore, is suitable for the implementation of a fully automatic segmentation approach.

Figure 1:
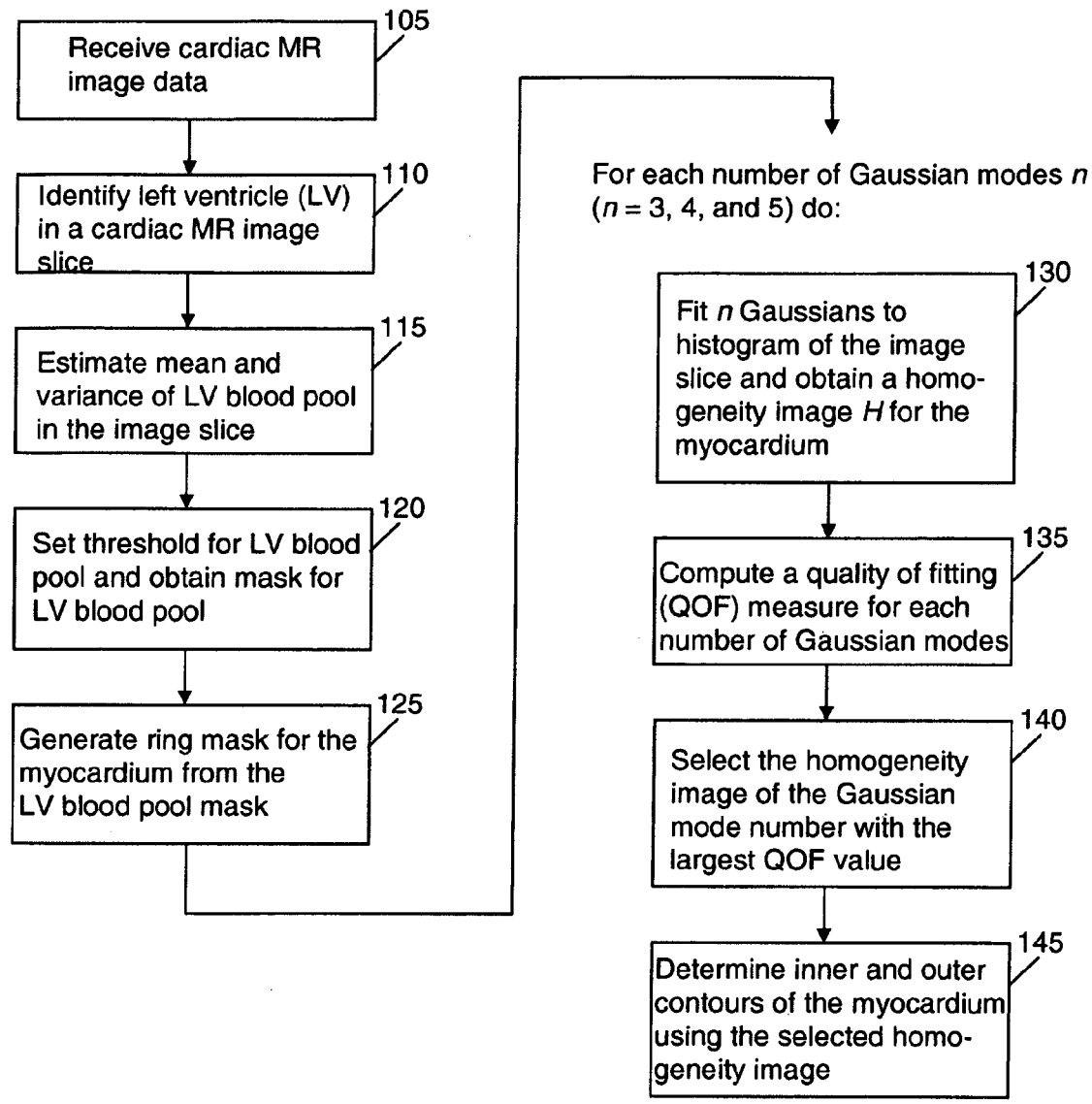
FIG. 1 is a flowchart that illustrates a method for Gaussian mode selection according to an exemplary embodiment of the present invention.

FIG. 1 is a flowchart that illustrates a method for Gaussian mode selection according to an exemplary embodiment of the present invention.

As shown in FIG. 1. cardiac magnetic resonance (MR) image data is received (105). It is to be understood that this image data may be acquired from an MR or computed tomography (CT) scanner, for example. This data may be received in real-time as a patient is undergoing scanning or it may be retrieved from a computer memory. In, for example, a slice of the image data, the left ventricle (LV) of the heart is identified (110). In other words, the coarse location of the LV center and/or its extents in the image is obtained either from automatic processing steps or from user input.

The image slice may be cropped to focus on the myocardium of the LV, for example. Example cropped images are shown in image sets (a-c) in FIG. 2.

The mean and variance of the LV blood pool is estimated using pixels within a small region at the center of the LV (115). An example of the LV blood pool is the bright area within the dark circle in the cropped image in image set (a) of FIG. 2. The size of this region could be of fixed dimension or it could be adapted to a current patient. For example, it could be set to have a radius of 50% of the approximate LV radius determined by a prior processing step.

Figure 3:
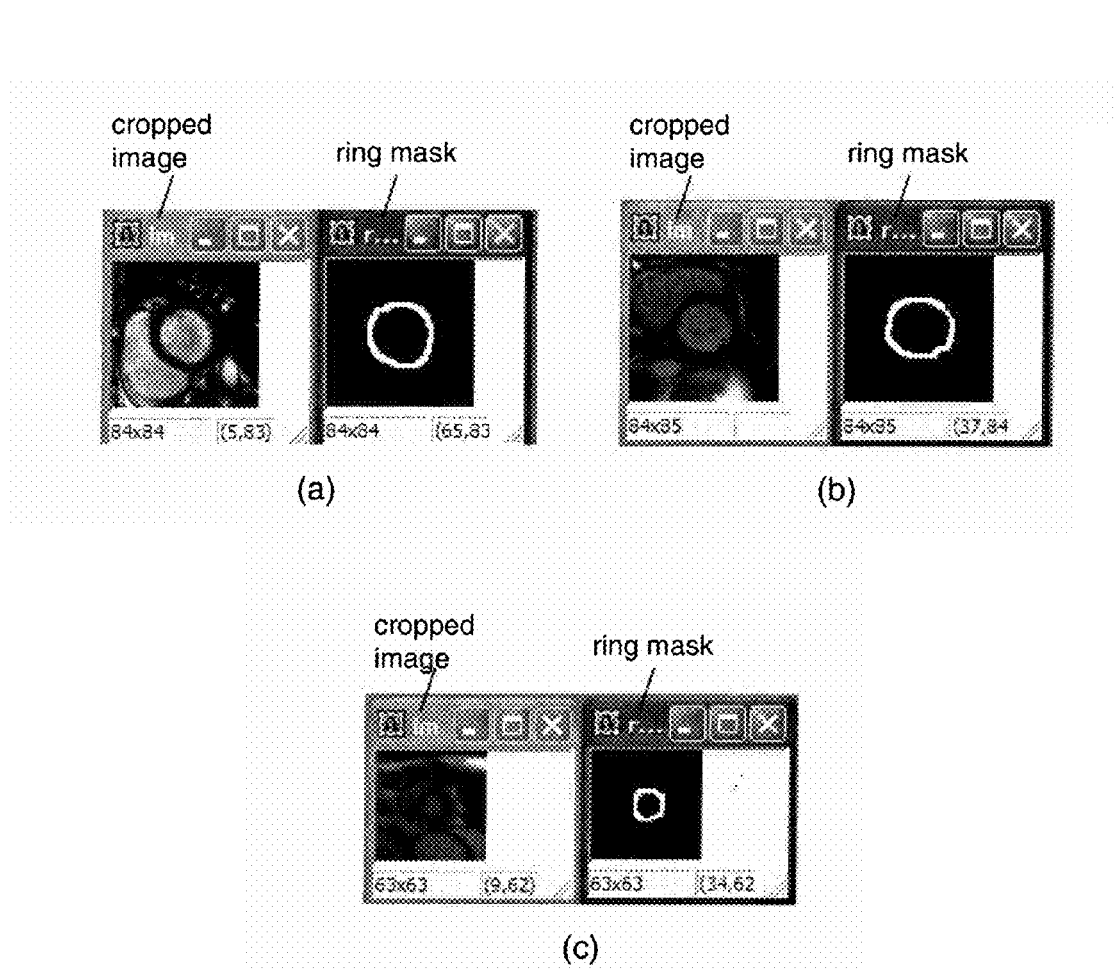
FIG. 3 illustrates a sample cropped image and its corresponding ring mask for an image containing three Gaussian modes (a), four Gaussian modes (b) and five Gaussian modes (c)

In step 120, a threshold for the LV blood pool is set either by means of a fixed value or by calculating a threshold t, where t=mean−const*standard deviation. A mask for the LV blood pool is further obtained in step 120 by identifying all pixels above the threshold. A ring mask R for the myocardium is generated from the LV blood pool mask (125). This is done, for example, by taking the LV blood pool and extending it by a heuristic factor. In other words, add a certain percentage to the LV raduis. An example of the ring mask R is shown in image sets (a-c) of FIG. 3.

For each number of Gaussian modes n (n=3, 4, and 5), do the following:

Fit n Gaussians to the histogram of the image slice and obtain the corresponding homogeneity image H for the myocardium (130). Example homogeneity images for three (m3), four (m4) and five (m5) modes, which correspond to the cropped image, are shown in image sets (a-c) in FIG. 2.

In step 135, a quality of fitting (QOF) measure is computed for each number of Gaussian modes as:

$$QOF = \left(\frac{1}{N} \sum_{(i,j) \in S} H_{ij}\right) \log(N),$$

where S is the collection of pixels that meet two constraints: $H_{ij}$>0.25 and $R_y$=1, and N is the total number of pixels in set S. In step 140, the homogeneity image of the Gaussian mode number with the largest QOF value is selected as the best homogeneity image for processing.

It is to be understood that: 1) QOF is a good criterion because the myocardium should be bright in the best homogeneity image for segmentation, i.e., have large H values; and 2) QOF can tolerate small errors in the estimated ring mask by ignoring pixels with small H values.

Figure 2:
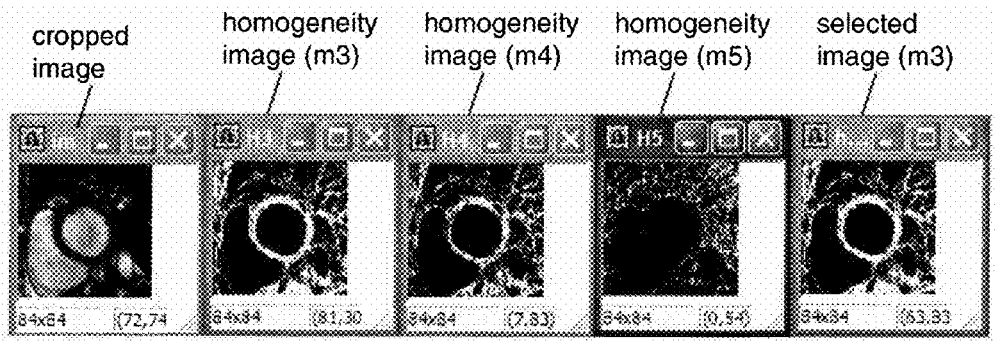
FIG. 2 shows representative results of the method for Gaussian mode selection according to an exemplary embodiment of the present invention.
Figure 2:
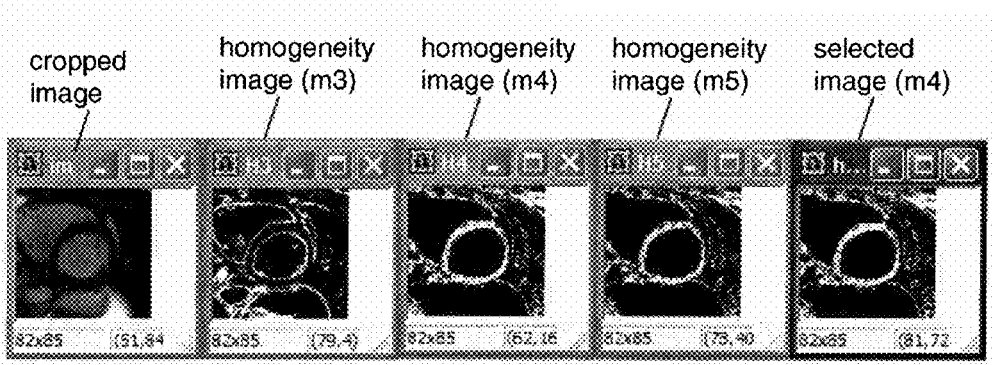
Figure 2:
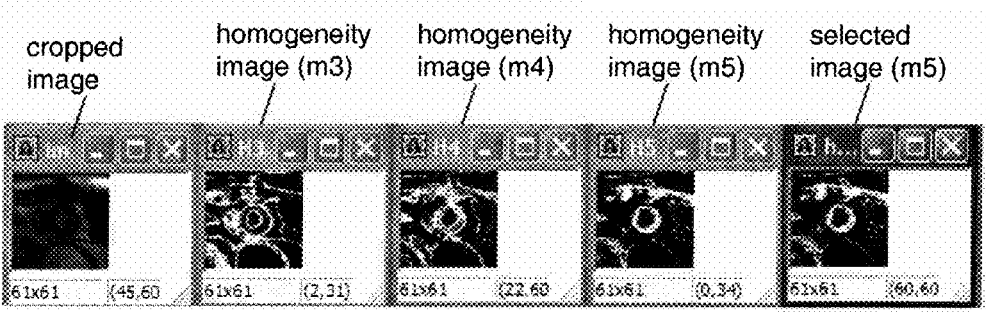

The rightmost image in image sets (a-c) in FIG. 2 is an example of a homogeneity image selected in step 140. As can be seen, the method for Gaussian mode selection according to an exemplary embodiment of the present invention is able to select the number of Gaussian modes that results in the best homogeneity image from different homogeneity images.

It is to be understood that the processing techniques for which the best selected homogeneity image cay be used include, inter alia, determining the inner and outer contours of the myocardium as shown in (145), for example. The inner and outer contours of the myocardium may be determined in accordance with the techniques described in [Jolly, M-P., "Automatic Segmentation of the Left Ventricle in Cardiac MR and CT Images", International Journal of Computer Vision 70(2), 151-163, 2006], the disclosure of which is incorporated by reference herein in its entirety.

It is to be further understood that the methodology described above may be applicable to any segmentation technique that involves: 1) a variable number of Gaussian modes corresponding to intensity classes and 2) prior information that allows an approximate region corresponding to a relevant Gaussian mode to be inferred. Thus, a robust quality of fit measure can be used to identify the optimal number of Gaussian modes to improve the quality/robustness of such a segmentation technique.

An example of such an alternative embodiment of the present invention could involve the segmentation of fatty tissue from MR images. Fat would correspond to an intensity class with high intensities. The optimal number of Gaussian modes would be unknown. The body could be separated from the background using existing techniques. An approximate segmentation of the fat region could be achieved by considering only bright pixels within a narrow band along the background-body interface using a similar QOF measure as for the cardiac case. The optimal number of Gaussian modes could be determined by the response in the homogeneity image as assessed by the QOF measure.

Figure 4:
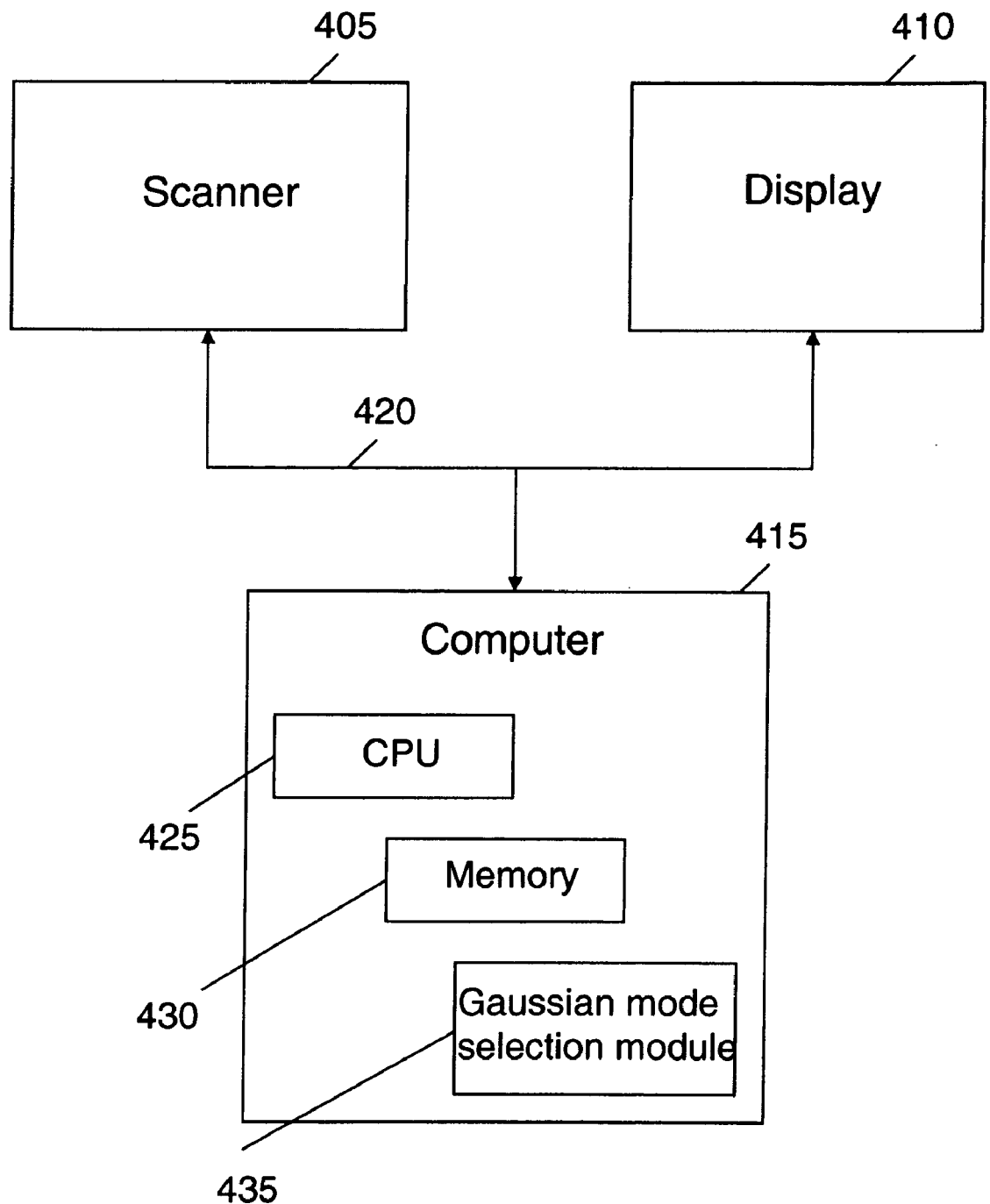
FIG. 4 is a system in which exemplary embodiments of the present invention may be implemented.

A system in which exemplary embodiments of the present invention may be implemented will now be described with reference to FIG. 4. As shown in FIG. 4, the system includes a scanner 405, a computer 415 and a display 410 connected over a wired or wireless network 420. The scanner 405 may be an MR or CT scanner, for example. The computer 415 includes, inter alia, a central processing unit (CPU) 425, a memory 430 and a Gaussian mode selection module 435 that includes program code for executing methods in accordance with exemplary embodiments of the present invention. The display 410 is a computer screen, for example.

It is understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is also understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It is further understood that the above description is only representative of illustrative embodiments. For convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for automatically selecting a number of Gaussian modes for segmentation of a cardiac magnetic resonance (MR) image, comprising:
   identifying a left ventricle (LV) in a cardiac MR image slice;
   quantifying the LV blood pool;
   obtaining a mask for the LV blood pool;
   generating a ring mask for a myocardium of the LV from the LV blood pool mask;
   fitting three Gaussian modes to a histogram of the image slice to obtain a corresponding homogeneity image for the myocardium;
   computing a quality of fitting (QOF) measure for the three Gaussian modes based on the corresponding homogeneity image;
   repeating the fitting and computing steps for four and five Gaussian modes; and
   selecting the homogeneity image of the number of Gaussian modes with the largest QOF measure as the homogeneity image for processing.

2. The method of claim 1, further comprising:
   determining inner and outer contours of the myocardium using the selected homogeneity image.

3. The method of claim 1, wherein the QOF measure is computed by the following equation:

$$QOF = \left(\frac{1}{N} \sum_{(i,j) \in S} H_{ij}\right) \log(N),$$

where S is a collection of pixels that meet two constraints: $H_{ij}$ and $R_y$, N is the total number of pixels in S, $H_{ij}$ is a probability of a pixel's inclusion in the LV blood pool and $R_y$ indicates that a pixel was identified as part of the LV blood pool by the ring mask.

4. The method of claim 3, wherein $H_{ij}$>about 0.25 and $R_y$=about 1.

5. A system for automatically selecting a number of Gaussian modes for segmentation of a cardiac magnetic resonance (MR) image, comprising:
   a memory device for storing a program: and
   a processor in communication with the memory device, the processor operative with the program to:
   identify a left ventricle (LV) in a cardiac MR image slice;
   quantify the LV blood pool;
   obtain a mask for the LV blood pool;
   generate a ring mask for a myocardium of the LV from the LV blood pool mask;

fit three Gaussian modes to a histogram of the image slice to obtain a corresponding homogeneity image for the myocardium;

compute a quality of fitting (QOF) measure for the three Gaussian modes based on the corresponding homogeneity image:

repeat the fitting and computing steps for four and five Gaussian modes; and select the homogeneity image of the number of Gaussian modes with the largest QOF measure as the homogeneity image for processing.

6. The system of claim 5, wherein the processor is further operative with the program to:

determine inner and outer contours of the myocardium using the selected homogeneity image.

7. The system of claim 5, wherein the QOF measure is computed by the following equation:

$$QOF = \left(\frac{1}{N}\sum_{(i,j)\in S} H_{ij}\right)\log(N),$$

where S is a collection of pixels that meet two constraints: $H_{ij}$ and $R_y$, N is the total number of pixels in S, $H_{ij}$ is a probability of a pixel's inclusion in the LV blood pool and $R_y$ indicates that a pixel was identified as part of the LV blood pool by the ring mask.

8. The system of claim 7, wherein $H_{ij}$>about 0.25 and $R_y$=about 1.

9. A non-transitory computer readable medium tangibly embodying a program of instructions executable by a processor to perform method steps for automatically selecting a number of Gaussian modes for segmentation of a cardiac magnetic resonance (MR) image, the method steps comprising:

identifying a left ventricle (LV) in a cardiac MR image slice;

quantifying the LV blood pool;

obtaining a mask for the LV blood pool;

generating a ring mask for a myocardium of the LV from the LV blood pool mask;

fitting three Gaussian modes to a histogram of the image slice to obtain a corresponding homogeneity image for the myocardium;

computing a quality of fitting (QOF) measure for the three Gaussian modes based on the corresponding homogeneity image;

repeating the fitting and computing steps for four and five Gaussian modes; and selecting the homogeneity image of the number of Gaussian modes with the largest QOF measure as the homogeneity image for processing.

10. The computer readable medium of claim 9, the method steps further comprising:

determining inner and outer contours of the myocardium using the selected homogeneity image.

11. The computer readable medium of claim 9, wherein the QOF measure is computed by the following equation:

$$QOF = \left(\frac{1}{N}\sum_{(i,j)\in S} H_{ij}\right)\log(N),$$

where S is a collection of pixels that meet two constraints: $H_{ij}$ and $R_y$, N is the total number of pixels in S, $H_{ij}$ is a probability of a pixel s inclusion in the LV blood pool and $R_y$ indicates that a pixel was identified as part of the LV blood pool by the ring mask.

12. The computer readable medium of claim 11, wherein $H_{ij}$>about 0.25 and $R_y$=about 1.

13. A method for automatically selecting a number of Gaussian modes for image segmentation, comprising:

coarsely identifying a region of interest in an image based on its intensity; and optimizing the region of interest by:

fitting a first number of Gaussian modes to a histogram of the image to obtain a corresponding homogeneity image for the region of interest;

computing a quality of fitting (QOF) measure for the first number of Gaussian modes based on the corresponding homogeneity image; and repeating the fitting and computing steps for at least one other number of Gaussian modes;

selecting the homogeneity image of the number of Gaussian modes with the largest QOF measure as the homogeneity image for processing.

14. The method of claim 13, wherein the image comprises an anatomical part.

15. The method of claim 13, wherein the image comprises a computed tomography (CT) or magnetic resonance (MR) image.

* * * * *